July 20, 1926. Re. 16,391

A. S. SPEER

ROOFING SLAB

Original Filed April 7, 1919

Inventor.
Alexander S. Speer.
Emery, Booth, Janney & Varney.
Attys.

Reissued July 20, 1926. Re. 16,391

UNITED STATES PATENT OFFICE.

ALEXANDER S. SPEER, OF BUFFALO, NEW YORK, ASSIGNOR, BY MESNE ASSIGNMENTS, TO CENTRAL TRUST COMPANY OF ILLINOIS, A CORPORATION OF ILLINOIS, AND AKSEL K. BODHOLDT, OF EVANSTON, ILLINOIS.

ROOFING SLAB.

Original Patent No. 1,318,238, dated October 7, 1919, Serial No. 288,035, filed April 7, 1919. Application for reissue filed October 5, 1921, Serial No. 505,634. Divided and this application for reissue filed April 6, 1923. Serial No. 630,239½.

This invention relates to roofing units for covering a roof or the like.

Among other objects, the invention is intended to provide improved roofing units which will afford greater protection against leakage when employed as a roof covering.

The invention consists in the novel constructions, combinations and arrangements, hereinafter described and claimed, for carrying out the above stated objects and such other objects as will appear from the following description.

The nature of the invention may be best understood by reference to one illustrative construction embodying the invention and shown in the accompanying drawing.

In said drawing:—

Figure 1:
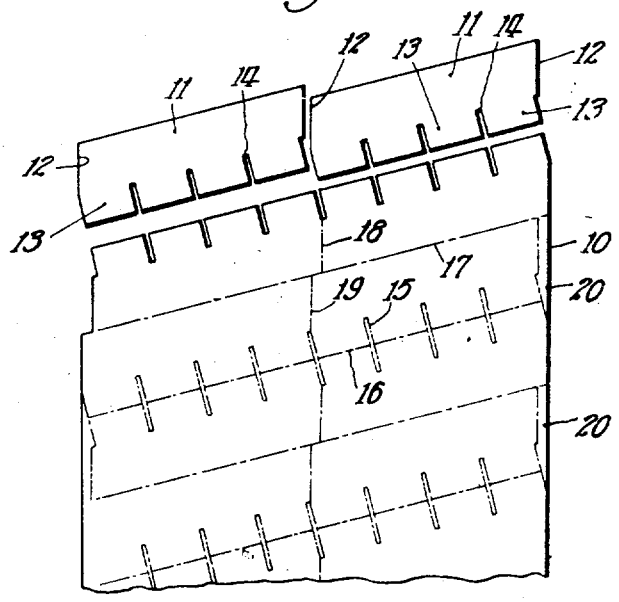
Fig. 1 is a plan view of a fragment of roofing material from which the units are formed and illustrates diagrammatically the manner in which the units are produced.

In the drawing, 10 designates a sheet of roofing material of limited width from which the units hereinafter described are formed. This roofing material is of a flexible character such as that well known in the art. Each roofing unit comprises an elongated body portion 11, the end edges 12 of which are inclined to the general line of the front edge of the unit. Projecting from the body portion 11 are a plurality of rectangular tabs 13. In the illustrative unit these tabs are spaced by a relatively narrow space or slot 14. The rectangular tabs 13 constitute shingle tabs which simulate individual shingles when the units are laid in a roof, as will be later described.

The units 11 may be conveniently formed from an elongated sheet of roofing material by cutting the units from the material on the bias, that is, by forming the units from the material in such a manner that the general line of the front edge of the unit is not at right angles to the side edges of the sheet 10 of material. By this manner of forming the units, the body portion is provided with inclined end edges 12 with a minimum waste of material.

In the arrangement shown, the sheet material 10 is made sufficiently wide to permit the formation of a pair of units 11 transversely of the sheet. The units may be formed by any suitable sequence of cutting operations. In the illustrative arrangement, a series of slots 15 are formed in the sheet, these slots being twice the depth of the shingle tab 13. The sheet is severed along diagonal lines 16 and 17 forming the front and back edges of the units. The sheet is also severed longitudinally along the lines 18, 19, etc., to divide each transverse strip into a pair of units. Preferably the longitudinal lines 18 and 19 are parallel with the side edges of the sheet and with the opposite end edges of the respective units. These lines are also preferably located at the corner of a slot 15. At any suitable stage in the formation of the units, the waste portions 20 occurring at alternate ends of a transverse strip of material, are severed from the units.

Figure 2:
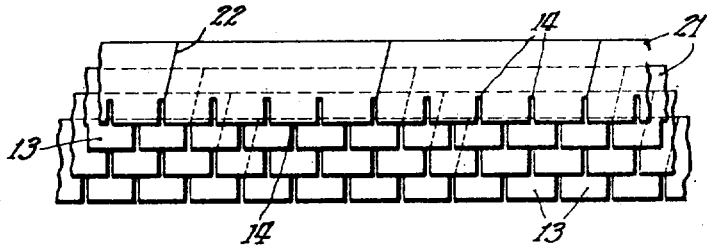
Fig. 2 is a plan view of a portion of a roof surface in which the illustrative unit has been employed.

In Fig. 2 is illustrated an arrangement of units in a roof covering. These units are laid in a series of overlapping courses 21 in such a manner that the front edges of one course register with the bases of the slots or spaces 14 between the shingle tabs 13 of the next lower course. Preferably also the shingle tabs of each course are staggered with respect to those of adjacent courses. It will be observed that the lines of juncture or joints 22 between the inclined ends of adjacent units are always out of register with the slots of any overlying courses of units. This arrangement minimizes the danger of leakage which tends to occur by the seepage of moisture entering through the slots of one course and tending to creep upwardly beneath that course. The lines of juncture never fall below a line of slots and accordingly the danger that the moisture will penetrate the roof through such joints is minimized.

This application is a division of my application for roofing slabs, Serial No. 505,634 filed October 5, 1921, the latter being an application for reissue of Letters Patent No. 1,318,238, issued October 7, 1919.

Having thus described my invention, I claim:—

1. A shingle unit comprising an elongated body portion having a plurality of spaced shingle tabs generally rectangular in outline projecting therefrom, the end edges of said body being inclined to the general line of the front edge of said body.

2. A shingle unit comprising an elongated body portion having a plurality of rectangular shingle tabs projecting therefrom and spaced apart by relatively narrow slots, said body having its end edges inclined to the general line of the front edge of said body.

3. In a roofing construction, the combination of a series of overlapping courses of roofing units, each course comprising a plurality of units laid end to end and having projecting therefrom spaced shingle tabs of a general rectangular outline; said units having their end edges inclined to the general line of the front edges of said courses, and arranged so that the shingle tabs of adjacent courses are in staggered relation, whereby the joints formed by the inclined end edges of adjacent units fall out of register with the spaces between the shingle tabs of the overlying courses.

4. In a roofing construction, the combination comprising a plurality of overlapping courses of roofing units, each unit comprising a body with inclined end edges and having tabs projecting therefrom and spaced apart by slots the sides of which are parallel; said units being laid end to end in each course with the shingle tabs of each course staggered relatively to the tabs of adjacent courses, whereby the inclined joints between adjacent units of one course are out of register with the slots between the tabs of any overlying courses.

5. In a roofing construction, the combination comprising a series of overlapping courses of roofing units, each course comprising a plurality of units laid end to end, and having inclined end edges and rectangular shingle tabs projecting from the units; said tabs being spaced apart and said courses being overlapped to expose the shingle tabs, thereby giving the appearance of a plurality of courses of individual shingles; the inclined parts between adjacent units falling out of register with the spaces between tabs in overlying courses.

ALEXANDER S. SPEER.